Sept. 2, 1969           A. WESP           3,464,268

METER FOR MEASURING AMOUNTS OF HEAT

Filed June 28, 1966           3 Sheets-Sheet 1

*Fig.1*

INVENTOR.
Adam Wesp

BY

Michael J. Striker
Atty

Fig. 2

Sept. 2, 1969 A. WESP 3,464,268
METER FOR MEASURING AMOUNTS OF HEAT
Filed June 28, 1966 3 Sheets-Sheet 3

*Fig. 3*

INVENTOR.
Adam Wesp
BY
Michael J. Striker
Atty

United States Patent Office 3,464,268
Patented Sept. 2, 1969

3,464,268
METER FOR MEASURING AMOUNTS OF HEAT
Adam Wesp, Ober-Roden-Messenhausen, Germany, assignor to Techem Gesellschaft zur Auswertung Technisch-Chemischer Verfahren und Patente mit Beschrankter Haftung, Frankfurt am Main, Germany
Filed June 28, 1966, Ser. No. 561,099
Int. Cl. G01k 17/06
U.S. Cl. 73—193        25 Claims

ABSTRACT OF THE DISCLOSURE

A vane wheel disposed in the inlet conduit or outlet conduit of a heat exchanger is rotated by the flowing heat conveying medium, and drives two rotary members which have heat transferring connections with the inlet conduit and outlet conduit, respectively. The rotary members are coupled by viscous liquids, which assume the temperatures of the inlet and outlet conduits, respectively, to driven members from which torques are transmitted to a control shaft driving a counter. The control shaft is rotated at a speed increasing or decreasing with the temperature difference between the viscous liquids. The temperature dependency of the viscosities of the viscous liquids is selected, and the parts of the apparatus are dimensioned so that no rotational movement is transmitted to the control shaft when the viscous liquids, and the medium in the inlet and outlet conduits have the same temperature, indicating no exchange of heat by the heat exchanger.

---

The present invention relates to an apparatus for measuring amounts of heat, and more particularly to a meter for measuring amounts of heat consumed and dissipated by the radiators of a central heating system for the purpose of charging the consumer. For example, the heat consumption of the radiators of an entire floor of an apartment house, of an entire house, or even a block of buildings may be provided with a meter.

However, the invention is not limited to the above-indicated uses, but the apparatus of the invention can be used in many other situations in which an amount of heat is to be measured in residential or industrial buildings, and the invention may even be applied to a single radiator or heat exchanger.

Heating systems use a heat conveying medium which is supplied to heat exchanging means, such as radiators, and is discharged from the same through outlet conduit means. The heat conveying medium may be warm or hot water, or steam, or any other suitable fluid. The apparatus of the invention includes elements built into the inlet conduit means, the outlet conduit means, or both conduit means.

Measuring devices and meters for heat amounts are known which are of a simple construction in which the flow velocity of the heat conveying medium, that is the amount of flowing medium per time unit, is disregarded, and only the difference between the average temperature of the heat conveying medium in the radiator and the temperature of the surrounding air is measured. This temperature difference is multiplied with the surface of the radiator and with a heat transfer factor for the respective radiator which is taken from existent tables.

Heat consumption meters of this type are in many cases too inaccurate, particularly for exactly measuring heat energy which requires finding the product of amounts of flowing medium per time unit and temperature difference, and an integration over the respective time period.

Other heat consumption meters according to the prior art are partly or fully responsive to variations of the flow velocity of the heat conveying medium, but the temperature of the heat conveying medium is measured only in the inlet conduit, or in the outlet conduit, or, like in the above-mentioned type of meter, at a point between inlet and outlet conduits, so that the result is inaccurate.

In order to overcome the disadvantages of the simple meters discussed above, it has been proposed to provide meters which are coupled with integrating devices in which the end result is derived from the variable flow velocity of the heat conveying medium, as well as from the varying temperatures in the inlet and outlet conduits. However, these heat consumption meters of this type according to the prior art have a very complicated and voluminous construction, are expensive to manufacture, and require a great deal of space, so that they can be used for all practical purposes only in industrial plants, but are unsuitable for use in residential central heating systems.

In the prior art constructions, vane wheels with bimetal vanes are located in the flowing heat conveying medium, one wheel being located in the inlet conduit, and the other vane wheel being located in the outlet conduit of the radiator. A differential transmission is provided between the shafts of the vane wheels, which determines the difference between the numbers of revolutions of the two vane wheels, and introduces this information into a counter. Due to the fact that the temperatures of the heat conveying medium in the inlet and outlet conduits are different, the bimetal vanes of the two vane wheels are differently deformed so that the rotary speeds of the two vane wheels are different. Consequently, the difference between the rotary speeds of the vane wheels represents a temperature difference between the inlet and outlet, and also the flow velocity of the heat conveying medium.

However, this construction of the prior art has the disadvantage that the bimetal vanes have to be constructed to be thin and therefore not rigid in order to respond to small temperature changes. As a result, the vanes flutter, and oscillate, and create turbulence in the flowing heat conveying medium whose influence on the measured results cannot be determined. Furthermore, bimetal vanes suffer strong corrosion from the heat conveying medium.

It is one object of the invention to overcome the above discussed disadvantages of known meters for measuring the amount of heat consumed and dissipated by radiators or other heat exchangers, and to provide an apparatus of simple and compact construction, which reliably and extremely accurately measures the amount of heat consumed by heat exchanging means, such as a radiator or a plurality of radiators.

Another object of the invention is to provide a measuring apparatus for measuring an amount of heat in which the result depends on the temperature difference in the inlet and outlet of the heat exchanger, and on the amount of the heat conveying medium flowing within a time unit into and out of the heat exchanger.

Another object of the invention is to measure the flow velocity of the heat conveying medium by fluid driven wheels of strong construction which do not create turbulence in the medium.

Another object of the invention is to drive the output shaft representing the measured amount by two means whose torques respectively depend on the temperatures of the heat conveying medium in the inlet and outlet conduits of a heat exchanger.

Another object of the invention is to use the fact that the viscosity of a liquid varies with its temperature, for introducing the temperature difference between the inlet and outlet of a heat exchanger, into the result of a metering operation for measuring the amount of heat consumed by a heat exchanger.

With these objects in view, the present invention relates to an apparatus for measuring amounts of heat, and more particularly to a meter for measuring the amount of heat consumed and dissipated by heat exchanger, such as a radiator or radiators.

Embodiments of the invention comprise the inlet and outlet conduits of the heat exchanger in which the heat conveying medium, such as hot water or steam, has under normal conditions different temperatures; rotary operating means, such as a vane or turbine wheel located in at least one of conduits and rotating at a speed depending on the flow velocity of the heat conveying medium; first and second fluid coupling means similar to rotary viscosimeters, each including a drive part rotated from the operating means, a driven part and a viscous liquid between the parts for transmitting torque between the same; and heat conducting means respectively connecting the inlet and outlet conduits with the first and second coupling means for maintaining the viscous liquids in the same at temperatures corresponding to the temperatures of the medium in the inlet and outlet conduits, respectively.

A counting mechanism has an input shaft rotated by the driven parts of the coupling means in dependence on the torques respectively transmitted to the driven parts of the coupling means. First and second torque transmitting means are coupled with each other and with the input shaft, and connected with the driven parts of the first and second coupling means, respectively, for rotation in such directions of rotation that the torque transmitted from the first coupling means to the first torque transmitting means, opposed to the torque transmitted from the second coupling means to the second torque transmitting means, and that the input shaft of the counting mechanism is rotated in the appropriate counting direction. The input shaft is thus rotated at a number of revolutions per time unit which depend on the temperature difference of the viscous liquid contained between the parts of the first and second coupling means, respectively, and on the corresponding temperature difference of the heat conveying medium passing through the inlet conduit and outlet conduit, respectively, and also on the amount of heat conveying medium passing per time unit through the conduits so that the number of revolutions per time unit increases with the increase of said amount and of said temperature difference. The transmission ratios between the above-mentioned operating means and the respective drive part of the first or second coupling means, and between the first torque transmitting means and the second torque transmitting means, and of the driving connection between the first and second torque transmitting means and the driven parts of the first or second coupling means are of such magnitude, the gaps between the drive part and the driven part of the first and second coupling means containing the respective viscous liquid are shaped and dimensioned in such a manner, and the temperature dependency of the viscosity of the viscous liquids is so selected that, if the temperatures of the viscous liquids in the gaps of the first and second coupling devices are equal, no rotational movement is transmitted from the torque transmitting means to the input shaft.

The viscous liquids in the first and second coupling means have a viscosity dependent on the temperatures thereof. Since the viscous liquids generally have different temperatures, depending on the temperature of the medium flowing in the input and output conduits, the torque transmitted by the first and second coupling devices depends on the last mentioned temperatures of the flowing medium, provided that all other conditions for the transmission of torque are maintained. Furthermore, the transmitted torques depend on the number of revolutions and on the angular velocity at which the drive parts of the two coupling means are driven by the rotary operating means which are provided in the inlet or outlet conduits, or in both conduits, and whose rotary speed depends on the amount of heat conveying medium flowing per time unit in the respective conduit in such a manner that the rotary speed of the drive parts of the coupling means increases when the amount of heat conveying medium flowing through the conduits per time unit increases. In accordance with the principle of the present invention, the driven parts of the coupling means are connected for rotation in such a manner that the torque acting on the driven part of the first coupling means is opposed to the torque acting on the driven part of the second coupling means. The above mentioned torque transmitting means are provided for this purpose and are coupled for rotation with each other and with the input shaft of the counter. The torque transmitting means are driven on one hand by the first coupling means and on the other hand by the second coupling means when the temperatures of the viscous liquids in the first and second coupling means are different. Meshing gears, or magnetically coupled magnets may be used as torque transmitting means. The directions of rotation of the torques transmitted to the torque transmitting means are in accordance with the invention selected in such a manner that the torque transmitting means oppose each other so that practically no torque is transmitted to the input shaft of the counter. From this follows that in the first coupling means, provided that this contains the colder viscous liquid, the direction of rotation of the driven part is the same as the direction of rotation of the drive part, whereas in the second coupling means, assuming that the same contains the warmer viscous liquid, the direction of rotation of the driven part of the second coupling means is opposed to the direction of rotation of the drive part of the same so that the latter acts as a brake on the driven part of the first coupling means. Due to the opposite actions of the two coupling means, the driven part of the first coupling means rotates relative to the corresponding drive part at a lower number of revolutions than the driven part of the second coupling means rotates relative to the respective drive part.

This difference between the relative number of rotations, or angular velocities, respectively, of the driven parts of the two coupling means is, during rotation, automatically great enough so that the above mentioned, almost complete mutual compensation of the transmitted torques takes place at the torque transmitting means. Therefore, the driven parts of the first and second coupling means, and thereby also the torque transmitting means and the input shaft of the counter, automatically assume rotary speeds which depend on the temperature differences of the viscous liquids contained in the first and second coupling means, respectively. The last mentioned rotary speed also automatically depends on the rotary speed of the drive parts of the first and second coupling means, and is consequently proportional to the amount of heat conveying medium flowing per time unit in the inlet and outlet conduits. Therefore, the number of revolutions of the input shaft of the counter is a measure for the amount of heat consumed between the inlet conduit and the outlet conduit through which the heat conveying medium flows. The directions of rotation of the torque transmitting means are selected so that the input shaft of the counter is rotated in such a direction of rotation as is required for the counter. Generally, the direction of rotation at the counter is selected so that the counter adds the consumed amount of heat. However, a counter may be used which, starting from an initial indicated amount of heat, counts downward and indicates decreased amounts of heat dependent on the amount of heat consumed between the input conduit and the output conduit by the heat exchanger means.

Summarizing, the rotary speed of the counter input shaft depends on the temperature difference between the viscous liquids in the first and second coupling means, and this temperature difference is the same as the temperature difference between the heat conveying medium in the inlet and outlet conduits. Since the rotary speeds at which the drive parts of the two fluid coupling means are driven depend on the flow velocity of the heat conveying medium, the rotary speed of the output shaft also depends on the amount of heat conveying medium flowing per time unit through the heat exchanger.

In accordance with the invention, the two driven parts of the first and second coupling means are connected with the control shaft driving the counter in such a manner that they urge the control shaft to turn in opposite directions of rotation. The direction of rotation of the driven parts of the coupling means whose viscous liquid is colder, prevails, and the driven part of the other coupling means, whose viscous liquid is warmer, offers resistance to such turning movement which reduces the speed of the input shaft of the counter in accordance with the temperature difference.

In one embodiment of the invention, the two driven parts drive a pair of meshing gears, one of which is secured to the control shaft. Since meshing gears turn in opposite directions, the control shaft is driven at a rotary speed depending on the temperature difference between the viscous liquids contained in the two coupling means. In another embodiment of the invention, the driven parts of the first and second coupling means are magnetically connected with the control shaft.

In order to bring the driven parts of the two coupling means, and also the counter, to a standstill when the temperature of the viscous liquids in the two coupling means are equal, in accordance with the present invention, the first and second coupling means, the viscous liquids contained in the same, and the transmsision ratios between the two coupling means and the rotary speed of the drive parts of the two coupling means are suitably selected, as explained above. This can be accomplished in a very simple manner by providing identical symmetrically arranged drive parts and driven parts in the two coupling means and by using the same viscous liquid in the same. Also, the drive parts are preferably rotated at the same speed. Such a geometrically and functionally symmetric construction of the two coupling means is preferred, but is not absolutely necessary since constructively different first and second coupling means can be tuned to provide exact results, a condition being, however, that the two driven parts and the control shaft connected thereto are stopped if the temperature is the same in the inlet and outlet conduits of the heat exchanger.

It is evident that the first and second heat conducting means which respectively connect the inlet and outlet conduits with the first and second coupling means, must be constructed in such a manner that the viscous liquids in the first and second coupling means, respectively have at least substantially the temperatures of the heat conveying medium in the inlet and outlet conduits.

In one embodiment of the invention, the operating means include first and second vane wheels respectively located in the inlet and outlet conduits and connected with the drive parts of the first and second coupling means.

In another embodiment of the invention, the operating means is a vane wheel located either in the inlet conduit or in the outlet conduit, and being connected to both drive parts for driving the same at the same speed. The speeds of the driven parts of the first and second coupling means depends, of course, on the temperature dependent viscosity of the viscous liquids in the first and second coupling means.

In certain embodiments of the invention, each coupling means includes an inner member and an outer member surrounding the inner member. The viscous liquid is located between the inner and outer members, and preferably also around the outer member in a casing. Either the inner member is the drive part transmitting a torque to the outer member, or the outer member is the drive part transmitting a torque to the inner member. In the embodiment in which the outer member is the driven part, and located in a viscous liquid, a certain braking effect takes place since the the viscous liquid has to be displaced in the casing by the rotating outer driven part. This braking effect of the viscous liquid is also influenced by temperature variations of the viscous liquid, and advantageously influences the accuracy of the measuring operation. It is also possible to rotate the casing together with the inner member so that the casing and inner member form the drive part, resulting in a greater transmissible torque.

The viscous liquid in the casing improves the conduction of heat to the torque transmitting part of the viscous liquid. While different liquids could be used between the inner and outer parts and the casing, it is preferred to use the same viscous liquid.

The casing forms a preferably annular gap with the outer member of the coupling means. If the viscous liquid in this gap of the first and second coupling means is the same, it is preferred that the gaps of the two coupling means have the same shape and dimensions, and are filled with the same amount of the viscous liquid.

In the embodiments of the invention in which vane wheels are located in the inlet and outlet conduits, they rotate in opposite directions and transmit torques in the same directions of rotation to the drive parts which drive the driven parts at corresponding directions of rotation. The construction of the device can be particularly simplified if the vane wheels are made hollow and filled with the viscous liquid, and serve as drive parts driving driven parts located within the viscous liquid.

In this embodiment, one or both driven parts may be constructed as permanent magnets which are coupled to each other by the magnetic field, while another permanent magnet fixed to the control shaft is rotated by the combined magnetic field. Instead of the third magnet, a magnetizable armature fixed to the control shaft may be provided which is rotated by the combined magnetic field of the two permanent magnets.

The heat conducting means may be constituted by a body of a material having high heat conductivity, or by a conduit in the proximity of the respective coupling means connected to the inlet or outlet conduit for receiving the heat conveying medium. It is advantageous to directly connect the housing of the vane wheel with the casing of one of the coupling means, and to provide a conduit containing the heat conveying medium in the proximity of the other coupling means. In this connection, it is immaterial whether the vane wheel is located in the inlet conduit or in the outlet conduit.

The viscous liquid in the coupling means is preferably a highly viscous oil, the same oil being preferably used in both coupling means. It is preferred to construct the two coupling means of identically dimensioned parts defining identically dimensioned gaps in which the viscous liquid is located. Preferably, the two coupling means are arranged symmetrically with the vane wheel or wheels and the respective conduits.

By suitably selecting the viscosity and temperature dependence of the viscous liquid, and the dimensions of the drive and driven parts in both coupling means, the particular function of the temperature dependency of the measured result can be selected as desired. The result indicated by the counter is preferably proportionate to the rotary speed of the vane wheel and to the difference between the temperatures of the heat conveying medium in the inlet and outlet conduits. A temperature function, or temperature dependency, respectively, assuring that the indicated result is proportionate to the temperature difference, is assumed with sufficient accuracy when a silicon oil is used in the coupling means, whose viscosity at room temperature is between 5,000 and 50,000 centistokes. The torques transmitted by the fluid couplings depend substantially on the mechanical construction and shape of the parts of the coupling means, particularly the dimensions of the gap between the drive and driven parts, and on the viscosity of the liquid in the coupling means.

If the viscosity and temperature dependency of the liquid and the geometrical shape of the coupling means are suitably selected, the indicated result is not proportionate to the temperature difference between inlet and outlet. Such modified temperature function may be desired if the consumer, for example the tenant of an apartment having several radiators, is to pay for heating the apartment not only in accordance with the temperature difference between inlet and outlet conduits, but also dependent on the height of the temperature of the supplied heat conveying medium flowing into the inlet conduit. It may be in the interest of the heat supplier, to heat the respective room or rooms by supplying a heat conveying medium at a comparatively low temperature but moving at a relatively high flow velocity instead of supplying a heat conveying medium at a very high temperature flowing at a low velocity. This is particularly the case if the heat conveying medium is heated from a source providing a low temperature, before being supplied to the radiators. Such a source of low temperature may be the waste heat or exhaust heat of another apparatus. An increase of the supplied temperature of the heat conveying medium above the waste heat temperature causes additional expenses which have to be carried by the consumer. In such a case, the present invention permits accounting arrangements between the supplier of heat and the consumer, by modifying the temperature function according to which the consumed heat is indicated, and paid.

The noved features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 3:
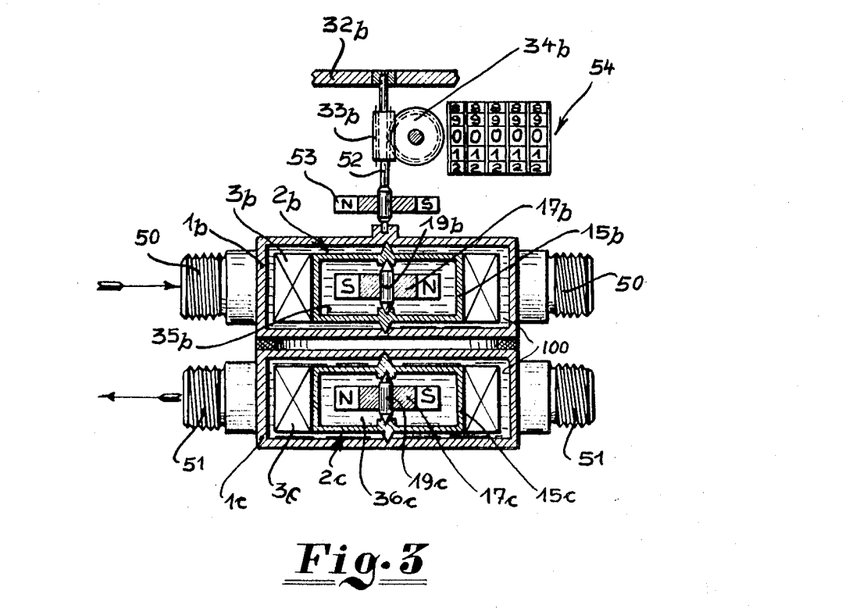
FIG. 3 is a fragmentary, partly schematic, vertical sectional view, illustrating a third embodiment of the invention.

Referring now to the drawings, in the embodiment illustrated in FIG. 3, an inlet conduit 50 and an outlet conduit 51 are shown which are connected to a heat exchanger means, such as one or several radiators so that a heat conveying medium supplied through inlet conduit 50 enters the radiators and after losing heat which is dissipated by the radiators, flows back to a source through the sake of simplicity. Casings 1b and 1c respectively form part of the inlet conduit 50 and outlet conduit 51 and envelope vane wheels 3b and 3c which are mounted for turning movement in casings 1b and 1c by means of conical journals which are supported in corresponding bearings of casings 1b and 1c. The heat conveying medium flowing in casings 1b and 1c in the directions of the arrows, causes rotation of the vane wheels 2b and 2c in opposite directions. The hubs 15b and 15c of vane wheels 2b and 2c are hollow cylindrical parts filled with a viscous liquid 35b and 36c, respectively. Permanent magnets 17b and 17c are respectively mounted by means of shafts 19b and 19c for rotation within the outer parts 15b, 15c. The axes of rotation of parts 15b, 15c, 17b, 17c, 2b, 2c coincide.

Parts 15b, 35b, 17b constitute a first hydraulic coupling means and parts 15c, 36c and 17c constitute a second hydraulic coupling means, each of which is in principle constructe dand operates like a rotary viscosimeter.

Since vanes 3b and 3c rotate parts 15b, 15c, the latter are the drive parts of the coupling means and since the inner parts 17b and 17c are taken along by the viscous liquids, the inner parts 17b and 17c are the driven parts of the two coupling means. Since vane wheels 2b and 2c are driven by vanes 3b and 3c in opposite directions of rotation, the drive parts 15b and 15c rotate also in opposite directions of rotation, urging the respective driven parts, 17b, 17c to rotate respectively in the same directions.

However, the driven parts 17b and 17c are permanent magnets and constitute connecting torque transmitting means coupled by the magnetic field for rotation.

The warmer heat conveying medium in inlet conduit 50 and casing 1b causes the viscous liquid 35b to assume a corresponding high temperature, while the cooled-off heat conveying medium in the outlet conduit 51 and in casing 1c causes the viscous liquid 36c to assume a lower temperature.

The viscous liquids are preferably the same and respond to different temperatures to have different viscosities. The viscosity of the cooler viscous liquid 36c will be greater than the viscosity of the warmer viscous liquid 35b. This difference between the viscosities is decisive for the speeds which the inner members 17b, 17c attain in the same direction of rotation since the torque transmitted from the outer part 15b, 15c to the inner parts 17b, 17c is proportional to the speed which the inner part attains relatively to the associated outer part.

Since the driven parts 17c and 17b are coupled by magnetic connecting means between which a magnetic field is formed, parts 17b will be taken along by part 17c and rotate at the same speed as driven part 17c. However, since driven part 17b is urged by drive part 15b to rotate in the opposite direction, the speed of driven parts 17b and 17c is reduced, and is a measure of the different viscosities of the warmer and colder viscous liquids 35b and 36c of the two coupling means. The rotary speed of the magnetically coupled torque transmitting parts 17b and 17c is such that the turning moments acting on parts 17b and 17c are practically equal and compensate each other. Vane wheel 2c, drive part 15c, and driven parts 17b and 17c rotate in the same direction, and vane wheel 2b, and drive part 15b rotate in the opposite direction of rotation which is of course opposite to the direction of rotation of part 17b which must follow part 17c.

A control shaft 52 is mounted on casing 1b and on a frame wall 32b for rotation about an axis coinciding with the axis of the permanent magnets 17b and 17c. A third permanent magnet 53 is fixedly secured to control shaft 52 and located in the magnetic field of permanent magnet 17b. A worm gear 33b is secured to shaft 52 and meshes with a worm wheel 34b which rotates at a lower speed and drives a counter schematically indicated by number wheels 54. Permanent magnet 53 is magnetically coupled with magnet 17b and consequently with magnet 17c, so that control shaft 52 is rotated at the same speed as magnets 17c and 17b. The rotary speed of magnet 53, control shaft 52, and one of the main shaft of the counter is proportionate to the rotary speed of drive part 15c and vane wheel 2c. However, the rotary speed of control shaft 52 and the rotary means connected therewith is also proportionate to the difference between the temperatures of the viscous liquids 35b and 36c, or at least dependent on this temperature difference. This is due to the face that the opposite torques respectively exerted by the oppositely rotating drive parts 15b and 15c through liquids 35b and 36c on magnet 17b and 17c depend on the temperature of the viscous liquids 35b and 36c, respectively, such torque slowing down the rotation of control shaft 52 and of magnet 17c. These torques are substantially equal to each other. As regards the dependence of the viscosity of the viscous liquids 35b, 35c on the temperature, the viscous liquids can be selected so that the speed of output shaft 52 is proportional to the difference between the temperatures of the viscous liquids.

In the embodiment of FIG. 3, the inner surfaces of casings 1b, 1c, parts of the heat conveying medium in the casing, and the outer surfaces of parts 15b, 15c constitute heat conducting means respectively connecting the inlet and outlet conduits 50 and 51 with the first and second coupling means 15b, 35b, 17b and 15c, 36c, 17c so that the viscous liquids 35b and 35c are maintained at different temperatures corresponding to the temperatures of the heat conveying medium in the inlet and outlet conduit means 50 and 51.

When the temperatures of the heat conveying medium in the inlet and outlet conduits are equal, the temperatures of the liquids 35b and 35c are also equal, and the viscosity is the same so that the opposing torques exerted by drive parts 15b and 15c on the driven parts 17b and 17c are equal so that the driven parts stop, resulting in stopping of shaft 52 with magnet 53 and no indication by indicator means 54. Evidently, no heat is consumed by the radiators if the temperature of the heat conveying medium in the outlet 51 after having passed through the radiators, is the same as the temperature of the medium entering the radiators through inlet conduit 50. Also in this condition, the torques of the two couplings means are opposite and equal because the dimensions and positions of parts 15b, 17b are identical with those of parts 15c, 17c, and because liquids 35b and 35c are the same liquids having the same viscosity. In the embodiment illustrated in FIG. 3, the driven parts 17b and 17c are shown to be permanent magnets, practically rigidly coupled with each other by the magnetic field, and also magnetically coupled with magnet 53. This construction has the advantage that the walls of the casings do not have to be penetrated by shafts so that no particular sealing means are required. However, it will be understood that the rigid coupling between driven parts 17b and 17c and control shaft 52 could be obtained by omitting magnet 53, extending control shaft 52 through casings 1b and 1c, and securing the driven parts 17b and 17c fixedly to the extension of control shaft 52. Cylindrical nonmagnetic driven parts 17b and 17c would be coupled with the cylindrical drive parts 15b, 15c by the viscous liquids in the gaps between the drive parts and the driven parts. It is evident that control shaft 52 will be driven in such an arrangement mainly by the driven part 17c but at a speed reduced due to the opposite torque exerted on control shaft 52 by driven part 17b which urges shaft 52 to rotate in a direction opposite to the direction in which it is driven by driven part 17c.

The permanent magnets of the embodiment of FIG. 3 may also be cylindrical, or be bars with two poles, or crossing bars with four poles.

In another modification of the embodiment of FIG. 3, drive parts 15b and 15c are connected with each other by a transmission for example gear transmission, to rotate in opposite directions. In such a construction, the vanes of one of the drive parts 15b or 15c may be omitted. The vaneless wheel serves then only as a container for the viscous liquid. The vanes on the other wheel constitute an operating means driven by the medium in the respective conduit for driving the drive parts of both coupling means.

While the indicating means 54 are adjusted to indicate the heat consumed by heat exchanging means, not shown, between inlet conduit 50 and outlet conduit 51, it is possible to provide an indicator rotated by one of the wheels 2b, 2c and indicating the number of revolutions of the same by which the amount of heat conveying medium supplied to the heat exchanger means is measured, as in a conventional water meter. Such an indicator facilitates the initial adjustment of the heating system to a particular desired amount of supplied heat conveying medium.

Figure 1:
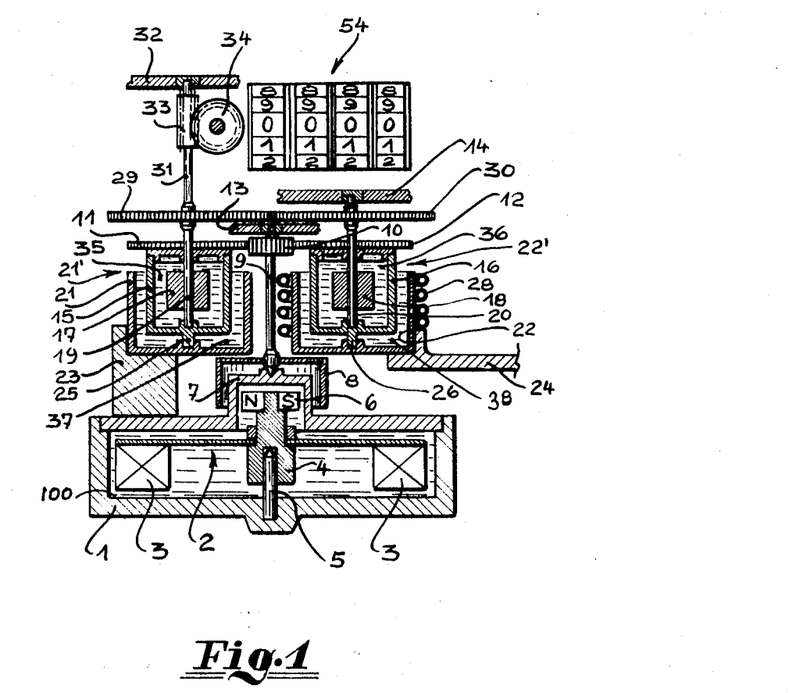
FIG. 1 is a fragmentary, partly schematic, vertical sectional view, illustrating a first embodiment of the invention.

Referring now to the embodiment of FIG. 1, a casing 1 forms part of the inlet conduit, or of the outlet conduit of heat exchanger means, not shown. An operating means, in the form of a vane wheel 2 having vanes 3 and a hub 4, is mounted on a shaft 5 in casing 1, and carries a permanent magnet 6 located in a housing portion 7 of the cover of casing 1. It is assumed that casing 1 forms part of the outlet conduit 51 of a heat exchanger means, not shown, as described with reference to FIG. 3, but it is also possible to reverse the arrangement and to provide casing 1 in the inlet conduit 50 which leads to the heat exchanger means. The vane wheel 2, 3 will be rotated by the heat conveying medium 100 at a rotary speed proportionate to the flow velocity of the flowing medium, and to the amount of medium per time unit supplied to and discharged from the heat exchanger means.

A bell-shaped armature 8 of a magnetizable metal, such as iron, extends around permanent magnet 6 and housing 7 and is fixed to a shaft 9, which carries a pinion 10 and is mounted on housing 7 and a frame wall 13 for rotation about an axis coinciding with the axis of shaft 5 and vane wheel 2.

Since magnet 6 and armature 8 constitute a magnetic coupling, shaft 9 will be rotated by vane wheel 2. It is possible to directly connect shaft 9 with the hub portion 4 of vane wheel 2, but the magnetic coupling 6, 8 has the advantage that no perforation of housing 7 and no sealing means are required. Another advantage of the magnetic coupling is that shaft 9 can rotate at substantially uniform speed while vane wheel 2 occasionally rotates in irregular movements due to fluctuations of the flow velocity of the heat conveying medium 100. It is advantageous to provide a speed reduction transmission between vane wheel 2 and shaft 9, the transmission being omitted in FIG. 1 for the sake of simplicity.

As in the embodiment of FIG. 3, first and second hydraulic coupling means generally indicated by reference numerals 21' and 22' are provided. The two coupling means 21' and 22' are constructed of identical parts having the same shape and spacing. Coupling means 21' has a casing 21 filled with a viscous liquid 37 and mounted on a heat conducting means 23 which is in contact with casing 1. Since the heat conducting means 23 has high thermal conductivity, the viscous liquid 37 in casing 21 is heated substantially to the temperature of the heat conveying medium in casing 1. An outer cylindrical member 15 has a journal portion 25 mounted in a corresponding bearing on casing 21 and has a top plate secured to a gear 11 which meshes with pinion 10. Gear 11 and the top plate have aligned central bores through which a shaft 19 passes which carries an inner cylindrical member 17 and is supported in a bearing in the bottom plate of the outer member 15. The outer cylindrical member 15 is filled with a viscous liquid 35, which is preferably the same as the viscous liquid 37.

Coupling means 22' has an outer casing 22 mounted on a frame part 24 spaced from casing 1 and preferably thermo-insulated from the same.

A tubular heating coil 28 surrounds casing 22 and communicates with the respective other conduit leading to the heat exchanger means, not shown, in the present case, the inlet conduit 50 shown in FIG. 3, since it was assumed that casing 1 is provided in the outlet conduit 51.

An outer member 16 is located in casing 22 and mounted on a journal shaft 26 for rotation. Outer member 16 rotatably supports a shaft 20 carrying an inner member 18 and a gear 30, and being also mounted in a frame wall 14. Gear 30 meshes with gear 29 which is secured to shaft 19 and a control shaft 31. The top plate of outer member 16 is secured to a gear 12 which meshes with pinion 10 and is spaced from gear 11.

When shaft 9 is rotated from vane wheel 2 through magnetic coupling 6, 8, pinion 10 rotates gears 11 and 12 in the same direction, together with parts 15 and 16, which are respectively hydraulically coupled by viscous liquids 35, 36 with the inner members 17, 18, by which shafts 19, 20 and meshing gears 29, 30 are driven. Meshing gears 29, 30 constitute torque transmitting means coupled to each other for rotation. It will be understood that the outer members 15, 16 are drive parts, that the inner members 17 and 18 are driven parts, and that the viscous liquids 35, 36 connect the drive parts with the driven parts so that devices 21', 22' constitute hydraulic coupling means. The inner surfaces of drive parts 15, 16, and the outer surfaces of driven parts 17, 18, are cylindrical so that annular gaps are formed between the drive and driven parts and are filled with the viscous liquid.

Since heat conducting means 23 maintain the viscous liquid 35 at least approximately at the temperature of the heat conveying medium 100 in the outlet conduit of the heat exchanger means, and heat conducting means 28 maintain the viscous liquid 36 at least approximately at the temperature of the inlet conduit means of the heat exchange means, the temperatures of the viscous liquids 35, 36 are different, and consequently the colder liquid 35 will have a higher viscosity than the warmer liquid 36.

Shaft 19 of coupling means 21' is connected with control shaft 31 mounted on wall portion 32 of the frame and carrying a worm 33 meshing with a worm gear 34 by which a counter, schematically illustrated by indicating means 54, is driven.

When the heat conveying medium 100 flows through casing 1 and rotates wheel 2 and thereby shaft 9 and pinion 10, gears 11 and 12 are rotated in the same direction together with drive parts 15 and 16, and torques are transmitted to the driven parts 17 and 18.

The driven parts 17, 19 and 18, 20 are connected to each other and to shaft 31 by the meshing gears 29, 30 so that they must rotate at the same speed and in opposite directions, driving control shaft 31 at the same speed and in the same direction as gear 29.

The direction of rotation of shaft 19 prevails since it is the direction of rotation of the driving part 15 and of the driven part 17 of the coupling device 21' which contains the cooler viscous liquid. Therefore shaft 20 with part 18 is forced by the meshing gears 29, 30 to rotate in opposite direction of rotation as part 19 and control shaft 31; thus the torque transmitted from drive part 16 to driven part 18 opposes such turning movement and reduces the speed of control shaft 31 so that the speed of the same, and the indicated amount of heat are influenced by, or are dependent on, the temperature difference between viscous liquids 35 and between 36, and the outlet and inlet conduits. The viscosities of liquids 35 and 36 depend on the temperature of the liquids in a previously explained relationship, and silicon oils have been found to be particularly suitable for the purpose. Viscous liquids 37 and 38 are preferably the same liquids as liquids 35 and 36, and should have a good heat conductivity since they conduct heat from means 23 and 28 to the two coupling means. Evidently liquids 37 and 38 will have temperatures corresponding to the temperatures in the outlet and inlet conduits.

It will be understood that the coupling means 21', 22' produce on control shaft 31 opposite and substantially equal torques depending on the temperatures of the liquids 35, 36 and on the rotary speed of operating means 2, 3, 6, 8, 9, 10, 11, 12, which is proportionate to the flow velocity of the heat conveying medium 100 in the inlet and outlet conduits.

When control shaft 31 is rotated, as explained above, gears 29 and 30 rotate at a rotary speed at which the opposite torques of the two coupling means 21', 22', are equal and compensate each other. The colder coupling means determines the direction of rotation of control shaft 31, and part 18 in the warmer coupling means 22' acts as a brake. The direction of rotation of vane wheel 2 must be selected so that the direction of rotation of shaft 19 and shaft 31 corresponds to the direction of rotation required for operating the counter and indicating means 54.

The indicated amount of consumed heat is the greater, the greater the temperature difference between the liquids in the hotter and cooler coupling means is. The indicated amount rises also proportionate to the number of revolutions of vane wheel 2, which is proportionate to the amount of heat conveying medium 100 flowing within a time unit through the heat exchanger and the inlet and outlet conduits. Since the viscosity of the liquids in the two coupling means depends on the temperature difference of the heat conveying medium in the inlet and outlet conduits, the result is also determined by this temperature difference, and such dependency on the temperature difference, and on the absolute temperature in the two coupling means, can be selected as desired by using liquids whose viscosity depends on the temperature in accordance with a particular function. For example, the measured and indicated result may be directly proportional to the temperature difference. If the temperature difference is zero, shaft 31 and gears 29, 30 must be at a standstill so that the counting mechanism is not driven. This is accomplished by making all corresponding parts and dimensions of coupling means 21', 22' identical, including the gaps between the drive parts and driven parts, and the gaps between the outer drive parts and the casings 21, 22. However, if necessary for any particular reason, the coupling means may be constructed at different dimensions, and/or driven at different rotary speeds, and/or filled with liquids of different viscosity, and all that is required is that the selection is carried out in such a manner that in the event that there is no temperature difference in the inlet and outlet conduits, and consequently the viscous liquids have the same temperature, the torques exerted by the two coupling means are equal and opposite, and compensate each other so that control shaft 31 and the indicating counter are not driven. Evidently, if the temperature of the inlet and outlet conduits are equal, no heat is consumed by the heat exchanger means to which the inlet and outlet conduits are connected.

Figure 2:
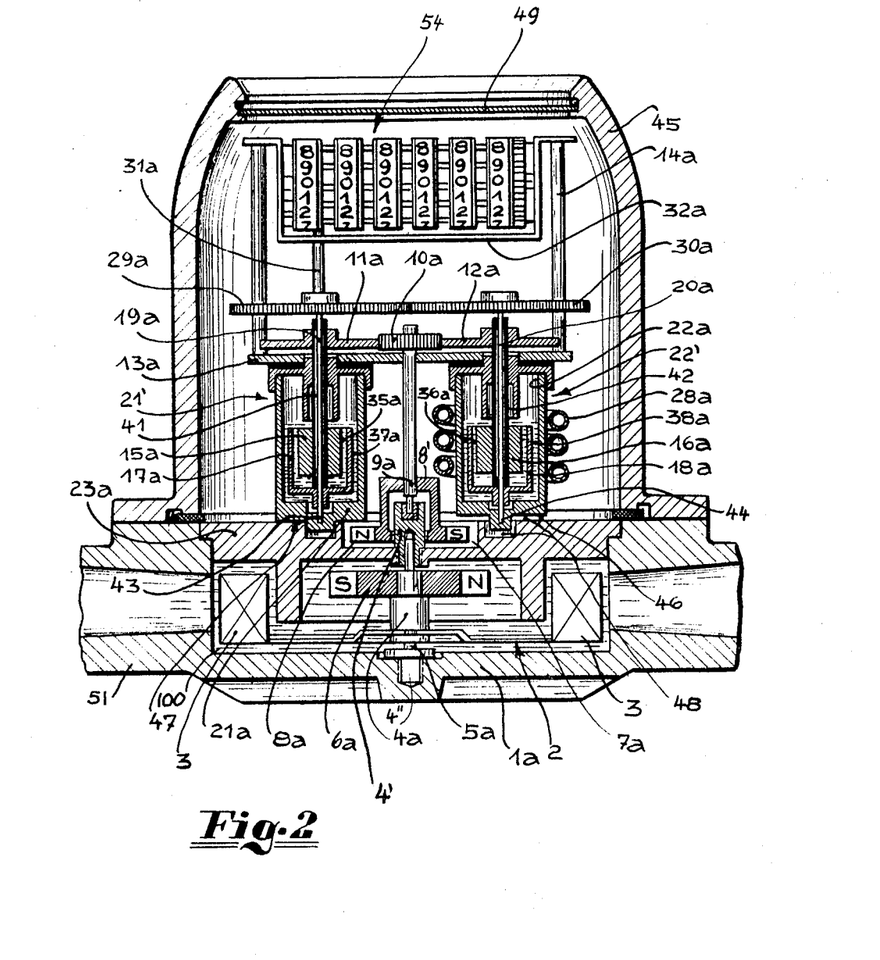
FIG. 2 is a fragmentary, partly schematic, vertical sectional view illustrating a second embodiment of the invention.

Referring now to FIG. 2, parts of the second embodiment which corresponds to parts of the first embodiment are indicated by like reference numerals, provided with the subscript $a$. The casing $1a$ forms part of the outlet conduit of a heat exchanger, not shown, through whose inlet conduit, not shown, a heat conveying hot medium, such as water or steam is supplied. A vane wheel 2 is mounted in casing $1a$ for rotation and thus measures the flow velocity of the heat conveying medium 100. Hub $4a$ of the vane wheel 2 carries a permanent magnet $6a$ located in a recess $7a$ of the cover $23a$ of casing $1a$. Hub $4a$ has a pair of journal portions mounted for rotation in bearing members 4' and 4". Bearing member 4' is threaded into a bore of cover $23a$, and has another bearing for a shaft $9a$ to which a hub portion 8' of the permanent magnet $8a$ is secured. Permanent magnets $6a$, $8a$ form a magnetic coupling which connects shaft $9a$ with vane wheel 2 for rotation, and as explained with reference to the embodiment of FIG. 1, shaft $9a$ could be directly connected with the hub $4a$ of vane wheel 2 which, however, would require sealing means which are avoided by the magnetic coupling $6a$, $8a$.

Shaft $9a$ carries a pinion $10a$ meshing with a pair of spaced gears $11a$ and $12a$ which are driven by pinion 10a in the same direction of rotation. Gears 11a and 12a are fixedly secured to hollow shafts 41 and 42 which are rotatably mounted in bearing portions of the top covers of casings 21a, 22a, of a pair of hydraulic coupling means 21', 22'. Casings 21a, 22a are fixedly secured between a frame wall 13a and cover 23a of casing 1a. The bottom surface of casing 21a abuts the top surface of cover 23a to provide a good heat conductive connection so that a viscous liquid 37a, 35a in casing 21a is heated substantially to the temperature of the heat conveying medium in casing 1a, and in the outlet conduit.

The bottom surface 46 of casing 22a is separated by an air gap 48 from cover 23a, and the gap may be filled with thermo-insulating material. A heating coil 28a surrounds casing 22a, and communicates with the inlet conduit, not shown, of heat exchanger means which may include several radiators, so that heat conveying medium at a high temperature flows through coil 28a and heats casing 22a and the viscous liquid 38a and 36a of the hydraulic coupling means 22'.

Coupling means 21' includes a pot-shaped cylindrical outer member 17a and a cylindrical inner member 15a secured to hollow shaft 41. A viscous liquid 35a is provided in the gap between the inner member 15a and the outer member 17a and a viscous liquid 37a is provided in the gap between the outer member 17a and casing 21a.

The inner member 15a is secured to the hollow shaft 41 and is rotated by the operating means 2, 6a, 8a, 9a, 10a, 11a at a speed proportionate to the flow velocity of the heat conveying medium 100 in outlet conduit. Consequently, the inner member 15a is the drive member of the coupling means which through the viscous liquid 35a exerts a torque on the outer driven member 17a to rotate the same. The viscosity of liquid 35a and 37a varies in accordance with the temperature.

Coupling means 22' has the same construction, and the inner cylindrical drive member is secured to shaft 42 and drives through viscous liquid 36a the outer cylindrical pot-shaped driven member 18a at a torque determined by the temperature of the viscous liquid 36a. Heating coil 28a is connected to the inlet conduit in which the heat conveying medium has the higher temperature, and the viscous liquid 35a is heated to the temperature of the heat conveying medium in the outlet conduit, which is lower.

The driven members 17a and 18a are respectively secured to shafts 19a and 20a which are mounted in bearings 43, 44 of casings 21a, 22a and pass through the interior of hollow shafts 41, 42 in which they are rotatably mounted.

Torque transmitting meshing gears 29a, 30a are respectively secured to shafts 19a, and 20a.

From the above description of coupling means 21' and 22', it will become apparent that the position of the drive parts and driven parts are reversed as compared with the embodiment of FIG. 1, and that the inner parts 15a, 16a tend to drive the outer parts 17a, 18a to turn in the same direction at a torque depending on the temperature of the viscous liquid. However, since gears 29a and 30a mesh with each other, parts 17a and 18a must turn in opposite directions, and the coupling means 21' which contains the cooler viscous liquid 35a, forces through gears 29a, 30a the inner part 18a to rotate in opposite direction to parts 15a, 17a and 16a, so that member 18a acts as a brake whose effect depends on the different viscosities of liquids 35a, 36a, and consequently on the different temperatures of the same, and of the outlet and inlet conduits of the heat exchanger means.

Due to the fact that a viscous liquid 37a and 38a is provided between the rotating parts 17a, 18a and casings 21a, 22a, an, additional braking effect is obtained which tends to reduce the speed of driven parts 17a, 18a. The viscous liquids 37a and 38a have preferably a viscosity which is dependent on the temperature according to the same mathematical function. It is best to provide the same quantities of the same viscous liquids in identically dimensioned and shaped gaps at 35a and 38a. Consequently, assuming other conditions to be equal, the control shaft 31a which is secured to gear 29a and shaft 19a will rotate at a lesser speed than in the embodiment of FIG. 1.

Nevertheless, under certain circumstances it may be advisable to provide a reduction gear, corresponding to the worm gear drive 33, 34 of FIG. 1 between control shaft 31a and the shaft of the counter which is schematically indicated in FIG. 2 by its number wheels 54. The counter is mounted on a frame portion 14a which rests on a plate 13a supported by casings 21a, 22a. A housing 45 is attached to casing 1a and envelops the coupling means 21' and 22', and the counter. A transparent window 49 permits the observation of the indicating number wheels 54. A corresponding housing is provided in the embodiments of FIGS. 1 and 3, but not illustrated for the sake of simplicity.

The rotary speed of control shaft 31a will depend on the rotary speed of the wheel 2 and on the temperature difference between the viscous liquids in coupling means 21', 22', which corresponds to the temperature difference of the heat conveying medium 100 flowing through the outlet and inlet conduits of the heat exchanger means. The drive torque exerted on control shaft 31a by the driven part 17a of coupling means 21' which depends on the temperature in the outlet conduit, is compensated by an equal and opposite braking torque of driven part 18a which depends on the temperature of the inlet conduit. The resulting rotary speed of control shaft 31a thus represents the temperature difference between the heat conveying medium in the inlet and outlet conduits.

It will be understood that each of the elements described above, or two or more together, may also find a useful application in other types of heat metering apparatus, differing from the types described above.

While the invention has been illustrated and described as embodied in a meter for measuring amounts of heat consumed and dissipated by the radiators of a central heating system and including hydraulic coupling means capable of transmitting a rotary speed which depends on the temperature of a viscous liquid in the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A meter for measuring amounts of heat exchanged by a heat exchange system, comprising, in combination, at least one heat exchanger, inlet and outlet conduit means adapted to be connected to said heat exchange system so that a heat conveying medium flowing therethrough and being cooled or heated in the heat exchange system has different temperatures in said inlet and outlet conduit means, and has the same temperature in said inlet and outlet conduit means when no heat is exchanged; operating means including at least one rotary member located in one of said conduit means and adapted to be rotated by said heat conveying medium flowing therethrough, first and second coupling means, each coupling means including a drive part rotatable by said operating means, a driven part, and a viscous liquid in a gap between said parts for transmitting torque and rotary movements between said parts, said viscous liquid in each of said coupling means having a viscosity dependent on the temperature thereof, said outlet and inlet conduit means having heat conducting connections with said first and second coupling means, respectively, for maintaining the viscous liquid in the same at approximately the temperatures of said medium in said outlet and inlet conduit means, respectively, so that the viscosities of said viscous liquids in said first and second coupling means depend on the temperatures of said heat conveying medium flowing through the respective conduit means; a counter for indicating amounts of heat; a control shaft for representing by the revolutions thereof an amount of heat and driving said counter; first and second rotary torque transmitting means coupled to each other and to said control shaft for rotation; and connecting means for transmitting rotary motion and torque from the driven part of said first coupling means to said first torque transmitting means, and so that the directions of said second coupling means to said second torque transmitting means in such directions of rotation that the torque transmitted by said first coupling means to said first torque transmitting means opposes the torque transmitted from said second coupling means to said second torque transmitting means, and so that the direction of rotation of said torque transmitting means and of said control shaft correspond to the direction of rotation required for operating said counter, said control shaft being driven by said torque transmitting means at a rotary speed which depends on, and increases and decreases with the temperature difference between the viscous liquids in said first and second coupling means and consequently depends on the temperatures of said medium in said inlet and outlet conduits, said rotary speed also depending on the amount of the heat conveying medium flowing within a time unit through said conduit means in such a manner that said rotary speed increases with an increased amount of flowing heat conveying medium, the arrangement being such that between said operating means and the respective drive parts of said first and second coupling means, between said first and second torque transmitting means, and between said first and second torque transmitting means and the driven parts of said first and second coupling means, rotation transmission ratios of such a magnitude prevail, that said drive and driven parts of said first and second coupling means and said gap are constructed and dimensioned in such manner, and that the temperature dependency of the viscosities of said viscous liquids in said first and second coupling means is so selected that when the temperatures of the viscous liquid in said first and second coupling means are equal, no rotational movement is transmitted to said control shaft.

2. A meter according to claim 1 wherein one of said parts of each of said first and second coupling means is pot-shaped and filled with said viscous liquid, and wherein the respective other part is located in said viscous liquid in said pot-shaped part so that torque is transmitted between said parts by said viscous liquid.

3. A meter according to claim 1 wherein said drive part and driven part of each of said coupling means have confronting cylindrical coaxial surface defining a circular gap filled with said viscous liquid; and wherein said driven part is formed as a container for said liquid in which said drive part is located.

4. A meter according to claim 3 wherein said operating means include first and second rotary operating members; and wherein each of said first and second coupling means includes a hollow shaft secured to said first and second operating members for rotation therewith, and carrying said drive part, and a pair of shafts respectively secured to said driven parts and passing through said hollow shafts; said first and second torque transmitting means connecting said last-mentioned shafts with each other and with said control shaft.

5. A meter according to claim 1 wherein each of said first and second coupling means includes a casing in which said drive part and driven part are located, one of said parts forming with the inner surface of said casing a circular gap of uniform thickness filled with the viscous liquid.

6. A meter according to claim 1 wherein said drive part of each of said first and second coupling means is shaped as a container for said viscous liquid, said containers being respectively in heat-conductive connection with said inlet and outlet conduit means for maintaining the viscous liquids at temperatures corresponding to the temperatures of said medium in said inlet and outlet conduit means, respectively.

7. A meter according to claim 1 and comprising first and second heat conducting means respectively connecting said inlet and outlet conduit means with said first and second coupling means, respectively, for maintaining the viscous liquids at temperatures corresponding to the temperatures of said medium in said inlet and outlet conduit means, respectively.

8. A meter according to claim 7 wherein each of said first and second heat conducting means includes a casing filled with a heat conductive liquid and enveloping said first and second coupling means, respectively.

9. A meter according to claim 1 and including a heating coil surrounding one of said coupling means and communicating with one of said inlet and outlet conduit means so that the respective surrounded coupling means and the viscous liquid thereof are heated to the temperature of the heat conveying medium flowing in said one conduit means.

10. A meter according to claim 1 wherein one of said coupling means includes a casing; and including a heat conductive member abutting said casing and the wall of one of said inlet and outlet conduit means so that said casing and the respective coupling means and the viscous liquid thereof are heated to the temperature of the heat conveying medium in the conduit means on which said heat conductive member abuts.

11. A meter according to claim 1 and including first and second casings enveloping said first and second coupling means, respectively, and being filled with a viscous liquid, said last-mentioned viscous liquid being the same as the viscous liquid located between said drive and driven parts of said first and second coupling means and being a highly viscous oil.

12. A meter according to claim 1 wherein said drive and driven parts of each of said first and second coupling means are separated by first gaps filled with said viscous liquid, said first gaps having the same shape and dimensions; and including casings surrounding said first and second coupling means and having the same dimensions, said casings being spaced from said coupling means by second gaps filled with said last-mentioned liquid, said second gaps having the same shape and dimensions.

13. A meter according to claim 1, wherein the viscous liquids of said first and second coupling means have such viscosities, and such temperature dependency that said control shaft rotates at a speed at least substantially proportional to the temperature difference between the heat conveying medium in said inlet and outlet conduit means, and to the amount of heat conveying medium flowing per time unit through said inlet and outlet conduit means.

14. A meter according to claim 1 wherein said viscous liquid of said coupling means is an oil whose viscosity at 20° C. is between 5,000 and 50,000 centistokes, and whose viscosity depends on the temperature thereof.

15. A meter according to claim 1 wherein said connecting means include first and second shafts respectively carrying said driven parts of said first and second coupling means, and first and second gears forming part of said first and second torque transmitting means and being connected for rotation in opposite directions so that said first and second shafts and said inner parts are rotated in opposite directions.

16. A meter according to claim 1 wherein said drive part and driven part of each said coupling means have confronting cylindrical coaxial surfaces defining an annular gap filled with said viscous liquid; wherein said driven part is formed as a pot-shaped container for said liquid in which said drive part is located; wherein said operating means located in one of said conduit means is coupled for rotation with the drive part respectively of said first and second coupling means by first and second operating members respectively; wherein said first and second coupling means respectively include first and second hollow shafts secured to said first and second operating members for rotation therewith, and carrying said drive parts of said first and second coupling means, respectively, and a pair of other shafts respectively secured to said driven parts and passing through said first and second hollow shafts, respectively; and comprising transmission means connecting said other shafts with each other and with said control shaft; and wherein said cylindrical surfaces of said first and second coupling means are respectively coaxial with said first and second shafts and with said driven parts.

17. A meter according to claim 1 wherein said rotation transmission ratios for said first and second coupling means are equal; wherein the shape and dimensions of said gap of said first and second coupling means are the same, and wherein the same amounts of the same viscous liquid are located in said gaps of said first and second coupling means.

18. A meter according to claim 1 wherein each of said first and second coupling means includes a container for a viscous liquid surrounding said drive and driven parts of the respective coupling means, and supporting said driven part of the respective coupling means for rotation in a position in which the outer surface of said driven part forms with the inner surface of said container an annular gap, and viscous liquids in said last mentioned gaps, the viscosity of said last mentioned viscous liquids being temperature dependent in accordance with the same mathematical function.

19. A meter according to claim 18 wherein the same amount of the same viscous liquid is located in each of said last mentioned gaps within said containers; and wherein said gaps have identical shapes and dimensions.

20. A meter for measuring amounts of heat exchanged by a heat exchange system, comprising, in combination, at least one heat exchanger, inlet and outlet conduit means adapted to be connected to said heat exchange system so that a heat conveying medium flowing therethrough and being cooled or heated in the heat exchange system has different temperatures in said inlet and outlet conduit means, and has the same temperature in said inlet and outlet conduit means when no heat is exchanged; operating means including first and second rotary members located in said inlet and outlet conduit means, respectively, and adapted to be rotated in opposite directions by said heat conveying medium flowing therethrough; first and second coupling means including first and second drive parts rotated in opposite directions by said first and second rotary members, first and second driven parts, and viscous liquids in the gaps between said drive parts and driven parts for transmitting torque and rotary movements between said drive parts and driven parts, said viscous liquids in said first and second coupling means having a viscosity dependent on the temperature thereof, said outlet and inlet conduit means having heat conducting connections with said first and second coupling means, respectively, for maintaining the viscous liquids in the same at approximately the temperatures of said medium in said outlet and inlet conduit means, respectively, so that the viscosities of said viscous liquids in said first and second coupling means depend on the temperatures of said heat conveying medium flowing through the respective conduit means; a counter for indicating amounts of heat; a control shaft for representing by the revolutions thereof an amount of heat and driving said counter; and connecting means for transmitting torque from said first and second driven parts to said control shaft in opposite directions of rotation that the torque transmited by said first coupling means to said control shaft opposes the torque transmitted by said second coupling means to said control shaft, and so that the direction of rotation of said control shaft corresponds to the direction of rotation required for operating said counter, said control shaft being driven at a rotary speed which depends on, and increases and decreases with the temperature difference between the viscous liquids in said first and second coupling means and consequently depends on the temperatures of said medium in said inlet and outlet conduits, said rotary speed also depending on the amount of the heat conveying medium flowing within a time unit through said inlet and outlet conduit means in such a manner that said rotary speed of said control shaft increases with an increased amount of flowing heat conveying medium, the arrangement being such that between said first and second rotary members and the respective first and second drive parts of said first and second coupling means, and between said first and second driven parts and said control shaft, rotation transmission ratios of such a magnitude prevail, that said drive and driven parts of said first and second coupling means and said gap are constructed and dimensioned in such manner, and that the temperature dependency of the viscosities of said viscous liquids in said first and second coupling means is so selected that when the temperatures of the viscous liquid in said first and second coupling means are equal, no rotational movement is transmitted to said control shaft.

21. A meter according to claim 20 wherein said first and second rotary members in said inlet and outlet conduit means are rotated by said flowing medium at a rotary speed depending on the amount of medium flowing through said inlet and outlet conduit means per time unit and being independent of the temperatures of said heat conveying medium in said inlet and outlet conduits.

22. A meter according to claim 20 wherein said rotary members are first and second vane wheels respectively located in said inlet and outlet conduit means and being rotated by the heat conveying medium flowing therethrough; and wherein said drive parts of said first and second coupling means are, respectively, parts of said first and second vane wheels, forming a cylindrical hub portion in the same and being filled with said viscous liquid, and wherein said driven parts of said first and second coupling means are respectively located in said hub portions formed by said drive parts, whereby said drive parts are, respectively, in heat-conductive contact with said heat conveying medium in said inlet and outlet conduit means, respectively.

23. A meter according to claim 22, said connecting means including means for coupling said driven parts with each other and with said control shaft for rotation in the same direction of rotation so that the driven part of the coupling means whose viscous liquid has a higher temperature is rotated in a direction opposite to the direction of rotation by which it is urged to turn by the respective associated drive part through said viscous liquid.

24. A meter according to claim 23 wherein said driven parts of said first and second coupling means are force connected; wherein at least one of said driven parts is a rotary permanent magnet; and including magnetic means secured to said control shaft for rotation therewith and being located in the magnetic field of said permanent magnet so that rotation of said permanent magnet causes rotation of said control shaft.

25. A meter according to claim 20 wherein said first and second drive parts are fixed to said first and second rotary members, and are hollow and filled with said viscous liquid, wherein said first and second driven parts are rotatably mounted in said hollow first and second drive parts for rotation about an axis coinciding with the axis of said control shaft; and wherein said connecting means include magnetic means for magnetically coupling said first and second driven parts with each other and to said control shaft.

References Cited
UNITED STATES PATENTS
2,774,242    12/1956    Wesp ---------------- 73—193
3,128,624    4/1964    Wesp ---------------- 73—193

FOREIGN PATENTS
510,143    10/1930    Germany.

JAMES J. GILL, Primary Examiner

HERBERT GOLDSTEIN, Assistant Examiner

U.S. Cl. X.R.

73—196, 233